United States Patent Office 3,361,694
Patented Jan. 2, 1968

3,361,694
PROCESS OF PREPARING AQUEOUS COATING COMPOSITIONS USEFUL FOR COATING POLYPROPYLENE FILMS
Edward Barkis, Philadelphia, and Albert D. Collevechio, Chester, Pa., assignors to Avisun Corporation, Philadelphia, Pa., a corporation of Delaware
No Drawing. Filed Dec. 16, 1963, Ser. No. 330,556
2 Claims. (Cl. 260—29.6)

This invention relates to a composition which is especially useful for coating flexible base sheets to improve their heat sealability. More particularly, it relates to an aqueous coating composition which is particularly useful for improving the heat sealability of certain thermoplastic films.

When, for example, uncoated, oriented polypropylene film is heat sealed, excessive shrinking causes unsightly joints. Unoriented polypropylene film requires excessive heat to produce a tight seal and renders the film unsuitable for conventional cellophane packaging equipment. Other films such as those produced from polyethylene terephthalate react in a like manner to heat sealing. Coating the problem film with a thermoplastic resin which is readily heat sealable is often an unsatisfactory answer to the problem since it is difficult to obtain adhesion between films of different chemical make-up.

It is a primary object of this invention to provide a composition which is useful for coating thermoplastic base sheets and is applied thereto in an aqueous medium.

It is a further object of this invention to provide a coating composition which will lend heat sealability to a base sheet and firmly adhere thereto.

It is a still further object of this invention to provide an aqueous coating composition to which aqueous dispersions of thermoplastic resins are added for obtaining a strongly adhering, heat-sealable coating on a base sheet.

It is a still further object of this invention to provide a less expensive composite, clear, easily heat-sealable, non-fibrous, flexible polymer based sheet.

These and other objects will be realized in accordance with this invention which comprises a composition of matter useful for coating flexible base sheets comprising a uniform dispersion in an aqueous medium of a mixture of about 20 to about 80 parts based on the weight of the mixture of an uncured epoxide resin having a softening point range of from about 45 to about 120° C. and an epoxy value equivalent per 100 gms. of from 0.1 to 1.5, and from about 80 to about 20 parts based on the weight of the mixture of an alkyd resin of an alkylene glycol and a terpene-maleic anhydride condensate, said alkyd resin having a softening point range of between about 80 and 125° C., said aqueous medium containing from about 1.0 to about 10% based on the weight of the aqueous medium of morpholine and from 2 to about 20% of ammonium hydroxide.

In general, the solids content of the aqueous dispersion ranges from about 10 up to about 70% and preferably from about 20 to 50% by weight.

The above aqueous preparation may be used alone to coat flexible polymer base sheets, e.g., polypropylene film, polyethylene film, polyester film, regenerated cellulose film, etc., or it may be combined with other aqueous dispersions of heat-sealable resins to coat these substrata. Heat-sealable resins include, for example, copolymers of a major proportion of vinylidene chloride, vinyl chloride-vinyl acetate copolymers, polystyrene, styrene-butadiene copolymers, styrene-acrylonitrile copolymers, acrylic copolymers, polyethylene, and the like. These added aqueous dispersions also have a solids content of from about 10 to about 70% and preferably from 20 to 50% by weight.

The two aqueous dispersions may be combined in any proportion as long as the epoxide-alkyd dispersion is at least about 10% by weight of the mixture.

The aqueous composition is applied to the base sheet in a conventional manner as by padding, dipping, spraying or the like. The coated sheet is then dried, usually by passing it through a heat zone, to produce a clear, heat-sealable, firmly adhering composite sheet.

Solid epoxide resins meeting the above description are all useful for this invention. In general, suitable uncured epoxide resins may be prepared by reacting under alkaline or acid conditions, polyhydric, aliphatic or aromatic alcohols with a polyepoxide. Examples of some of these reaction components are glycerol and bis(2,3-epoxypropyl)ether; sorbitol and bis(2,3-epoxy-2-methylpropyl) ether; pentaerythritol and 1,2-epoxy-4,5-epoxypentane; bisphenol and bis(2,3-epoxypropyl)ether; resorcinol and bis(2,3-epoxypropyl)ether; etc. Other useful solid epoxide resins may be prepared by reacting a polyhydric phenol and an excess of a halo-epoxide in the presence of a catalyst and then dehydrochlorinating the product. Examples of some of these reaction components include bisphenol H[p,p'-isopropylidene diphenol] and epichlorohydrin; bisphenol B(p,p'-sec-butylidene diphenol) and glycerol dichlorohydrin. Still other useful solid epoxide resins are obtained by reacting polyhydric phenol including resorcinol, catechol, bisphenol, bis(2,2-dihydroxydinaphthyl)methane, etc., with an excess of halo-epoxide including, for example, 3-chloro-1,2-epoxybutane; 3-bromo-1,3 epoxyhexane, 3-chloro-1,2 epoxyoctane, epichlorohydrin, etc. in the presence of an alkaline medium. The above-described processes and epoxide resin products are well known in the art and many are commercially available.

The alkyd resins of this invention are also known resinous materials derived from the reaction of an alkylene glycol, e.g., ethylene glycol, propylene glycol, diethylene glycol, triethylene glycol, etc., with the condensation product of maleic anhydride or acid with a terpene, e.g., terpinene, terpinolene, terpineol, dipentene, pinene, etc. Organic carboxylic acids, fatty oils, rosin, abietyl radical containing compounds, and the like may be reacted with the glycol-terpene-maleic anhydride components to form a modified product.

The basic components of the aqueous medium are necessary to saponify the alkyd resin so that a stable dispersion will result. The addition of both the organic base, morpholine, and the inorganic base, ammonium hydroxide, is necessary to the invention. Morpholine alone, while capable of saponifying the resin is extremely hard to dry. Ammonium hydroxide is easily dried but will not by itself cause saponification of the alkyd resin. Together they readily produce a stable dispersion and are easily dried. They also provide an aqueous emulsion or dispersion which wets a hydrophobic base sheet such as polypropylene film with ease, a feature not common with aqueous systems unless large amounts of surfactants are present which usually cause haze and loss of adhesion. In addition, the organic amine serves to promote curing of the epoxide resin in the coating process. Other bases tried, such as sodium hydroxide and mono, di or triethanolamine are detrimental to adhesion, heat seal, and/or finished film clarity.

Other additives may be included in the coating composition to improve the finished surface characteristics. For example, waxes or wax-like materials are added to the aqueous dispersion in amounts up to about 5% by weight to improve slip characteristics. The wax additive is usually introduced to the aqueous coating composition in emulsion form.

Clays or dispersions thereof are also added to the aqueous coating composition in amounts up to about 4% by weight to improve blocking and slip characteristics.

The following examples are set forth to demonstrate this invention.

Example I

A powdered mixture of 60 parts of an uncured epoxide resin having a softening point range of 50–60° C. and epoxy value equivalent/100 g. of 0.22 (commercially available as "Araldite 6060") and 40 parts of an alkyd resin consisting of the unmodified reaction product of an alkylene glycol and terpene-maleic anhydride condensate and having a softening point range of from 100 to 110° C. (commercially available as "Petrex SS") was dispersed in 150 parts of water containing 5 parts of morpholine and 10 parts of ammonium hydroxide. All parts of the above dispersion are given by weight.

2% of a clay dispersion and 4% based on the weight of the dispersion of a hydrocarbon wax dispersion were incorporated in the dispersed resin preparation.

This preparation was applied to the surface of an electrically treated biaxially oriented polypropylene base film and the coated film dried. The resulting composite sheet exhibited high clarity and excellent heat sealability. The coatings adhered firmly to the substratum.

Example II

The epoxide resin and alkyd resin of Example I were dispersed in water at 11.5% and 7.6%, respectively, based on the weight of the dispersion. The water already contained 1.6% morpholine and 3.3% by weight of ammonium hydroxide. One part by weight of the above formulation was added to and thoroughly mixed with one part by weight of an aqueous dispersion of polystyrene at a solids concentration of 25%.

4% hydrocarbon wax emulsion and 2% clay dispersion were added to the finished formulation. This coating composition was applied to a base film as described in Example I and dried. The clear, coated film produced neat, strong heat seals and the coating strongly adhered to the base member.

Example III

A mixture of 40% by weight of the epoxide resin of Example I and 60% by weight of the alkyd resin of Example I was dispersed in water containing 6 parts by weight of morpholine and 10 parts ammonium hydroxide. The solids concentration of the dispersion was 40%.

29 parts by weight of the above dispersion was mixed with 71 parts by weight of an aqueous dispersion containing a copolymer of 90% vinylidene chloride and 10% acrylonitrile at a solids concentration of 50% by weight.

2 parts by weight of a clay dispersion and 4 parts of a hydrocarbon wax dispersion was added to the finished aqueous composition.

The above coating composition was applied to the film of Example I and dried. The resulting clear, composite sheet demonstrated excellent heat sealability and adhesion between coating and base film.

The coating compositions of this invention are especially attractive from the standpoint of reducing fire hazards and solvent inhalation problems.

Various changes and modifications may be made practicing the invention without departing from the spirit and scope thereof and, therefore, the invention is not to be limited except as defined in the appended claims.

We claim:

1. A process of preparing a polypropylene film having a heat-sealable coating thereon which process consists essentially of (I) applying to at least one side of said sheet (A) a stable aqueous dispersion having a solids content of between about 10% and 70% by weight consisting essentially of a mixture of (1) from about 20 to about 80 parts based on the weight of the mixture of an uncured epoxide resin having a softening point range of from about 45 to about 120° C. and an epoxy value equivalent per 100 grams of from about 0.1 to 1.5, and (2) from about 80 to about 20 parts based on the weight of the mixture of an alkyd resin of an alkylene glycol and a terpene-maleic anhydride condensate having a softening point range of between about 80 and 125° C., or (B) at least 10% by weight of the stable aqueous dispersion described in (A) plus a stable aqueous dispersion having a solids content between about 10% and 70% by weight consisting essentially of (1) copolymers having a major proportion of vinylidene chloride, (2) vinyl chloride-vinyl acetate copolymers, (3) polystyrene, (4) styrene-butadiene copolymers, (5) styrene-acrylonitrile copolymers, (6) acrylic copolymers, or (7) polyethylene, each of said aqueous dispersions (A) and (B) containing from about 1.0 to about 10% based on the weight of said medium of morpholine and from 2 to about 20% of ammonium hydroxide and (II) drying said coated sheet thereby to produce a clear, heat-sealable, firmly adhering coated polypropylene sheet.

2. A process of claim 1 wherein the solids content of each of said aqueous dispersions is between 20% and 50% by weight.

References Cited

UNITED STATES PATENTS

| | | | |
|---|---|---|---|
| 3,231,411 | 2/1966 | Tyler et al. | 260—29.6 |
| 3,277,040 | 10/1966 | Barkis et al. | 260—835 |
| 2,944,996 | 7/1960 | Berenbaum | 260—835 |
| 3,052,647 | 9/1962 | Pietsch et al. | 260—835 |
| 2,294,651 | 9/1942 | Billing | 260—75 |
| 2,486,756 | 11/1949 | Murphy et al. | 260—29.6 |
| 3,118,848 | 2/1964 | Lombardi et al. | 260—29.6 |
| 3,222,211 | 12/1965 | Updegrove et al. | 117—138.8 |

GEORGE F. LESMES, *Primary Examiner.*

MURRAY TILLMAN, *Examiner.*

J. L. WHITE, *Assistant Examiner.*